United States Patent [19]

Häfner

[11] Patent Number: 4,646,943
[45] Date of Patent: Mar. 3, 1987

[54] APPARATUS FOR CONTINUOUS GRAVIMETRIC METERING AND FEEDING OF POURABLE MATERIAL

[75] Inventor: Hans W. Häfner, Aichach-Walchshofen, Fed. Rep. of Germany

[73] Assignee: Pfister GmbH, Fed. Rep. of Germany

[21] Appl. No.: 683,996

[22] Filed: Dec. 20, 1984

[30] Foreign Application Priority Data

Dec. 23, 1983 [DE] Fed. Rep. of Germany ....... 3346897

[51] Int. Cl.$^4$ ....................... B65G 53/46; G01F 11/10
[52] U.S. Cl. .................... 222/148; 222/636; 222/264; 222/370; 406/63
[58] Field of Search ............... 222/636, 217, 367, 370, 222/148, 264, 216; 406/63-68; 414/219, 220

[56] References Cited

U.S. PATENT DOCUMENTS

| | | | |
|---|---|---|---|
| 764,258 | 7/1904 | Schlicht | 222/264 |
| 829,112 | 8/1906 | Lathrop | 222/264 X |
| 1,495,178 | 5/1924 | Hodgdon | 222/264 X |
| 2,314,031 | 3/1943 | Colburn | 222/636 X |
| 2,766,911 | 10/1956 | Greaves et al. | 222/148 |
| 3,273,758 | 9/1966 | Starrett | 406/64 X |
| 4,092,046 | 5/1978 | Bombelli et al. | 222/370 X |

FOREIGN PATENT DOCUMENTS

| | | |
|---|---|---|
| 368747 | 11/1982 | Austria . |
| 1926915 | 1/1970 | Fed. Rep. of Germany ........ 406/67 |
| 2419241 | 10/1979 | France . |

Primary Examiner—Joseph J. Rolla
Assistant Examiner—Nils Pedersen
Attorney, Agent, or Firm—Armstrong, Nikaido, Marmelstein & Kubovcik

[57] ABSTRACT

The apparatus includes a rotor mounted in and sealed in a housing for rotation about a vertical axis and including a plurality of pockets. Between the peripheral outer side wall of the rotor and the cylindrical inner surface of the housing there is an interspace which is supplied with a pressurized gaseous medium and an exit port for discharging pourable material entering the interspace.

16 Claims, 5 Drawing Figures

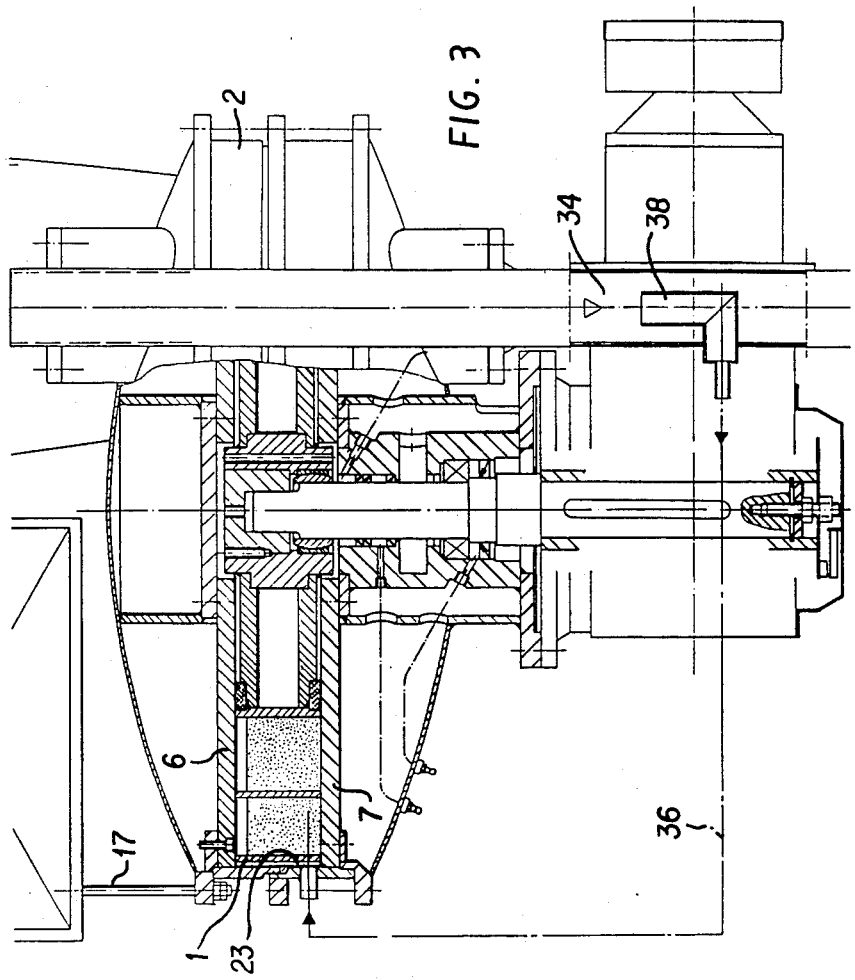

APPARATUS FOR CONTINUOUS GRAVIMETRIC METERING AND FEEDING OF POURABLE MATERIAL

FIELD OF THE INVENTION

The invention relates to an apparatus for continuous gravimetric metering and feeding of pourable material, in particular an apparatus operating as a loop conveyer.

BACKGROUND OF THE INVENTION

In my pending U.S. patent application Ser. No. 492135 filed May 6, 1983, now U.S. Pat. No. 4,528,848. I have disclosed an apparatus, as set forth above, of the type of a loop conveyer, comprising a housing including a side wall having an essentially cylindrical inner surface, an upper and a lower face wall provided with charging and discharging ports respectively and a rotor mounted in and sealed to the housing for rotation about a vertical axis. The rotor is provided with a plurality of laterally closed pockets and has a peripheral, cylindrical surface forming an annular interspace with the inner, cylindrical surface of the side wall of the housing. Pourable material, filled into the rotor through the charge port, is conveyed through a measuring path and then dischargedthrough the discharge port. With the known apparatus, the lower and upper face walls of the housing are in resilient engagement with the upper and lower faces of the rotor, which results in a noticeable friction between the engaging parts. Also, despite the sealings provided, some of the very fine particles of the pourable material, for instance coal dust, may penetrate out of the pockets into the interior of the rotor or into the interspace between the inner cylindrical surface of the housing and the peripheral cylindrical surface of the rotor.

SUMMARY OF THE INVENTION

In consideration of the above it is an object of the invention to provide an apparatus as set forth above having a high exactness of measurement.

It is another object of the present invention to provide an apparatus as set forth above having a longer lifetime of operation.

It is a further object of the invention to provide an apparatus as set forth above having reduced power consumption.

These and other objects are achieved by an apparatus as set forth above the circular interspace between the peripheral surface of the rotor and the inner surface of the housing in adapted to be connected to a source of a pressurized gaseous medium, preferably air.

Since the circular interspace is under continous pressure of the gaseous medium any entering of powdered material from the rotor pockets is prevented.

Preferably as a source of pressurized gaseous medium a branching off from the pneumatic feeding system provided with the apparatus is used. A particularly intensive cleaning of the interspace is achieved by providing one or several discharging ports leading into the pneumatic feeding system.

BRIEF DESCRIPTION OF THE DRAWINGS

FIG. 3 shows an embodiment of the apparatus according to the invention similar to that according to FIGS. 1 and 2 partly in section and explaining the features of the invention;

DESCRIPTION OF THE PREFERRRED EMBODIMENT

Figure 2:
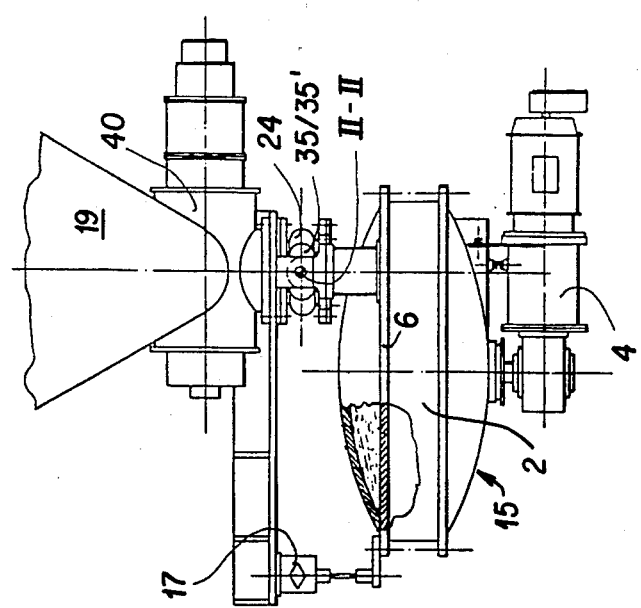
FIG. 2 shows the apparatus according to FIG. 1 in direction of the arrow VI in FIG. 1.
Figure 4:
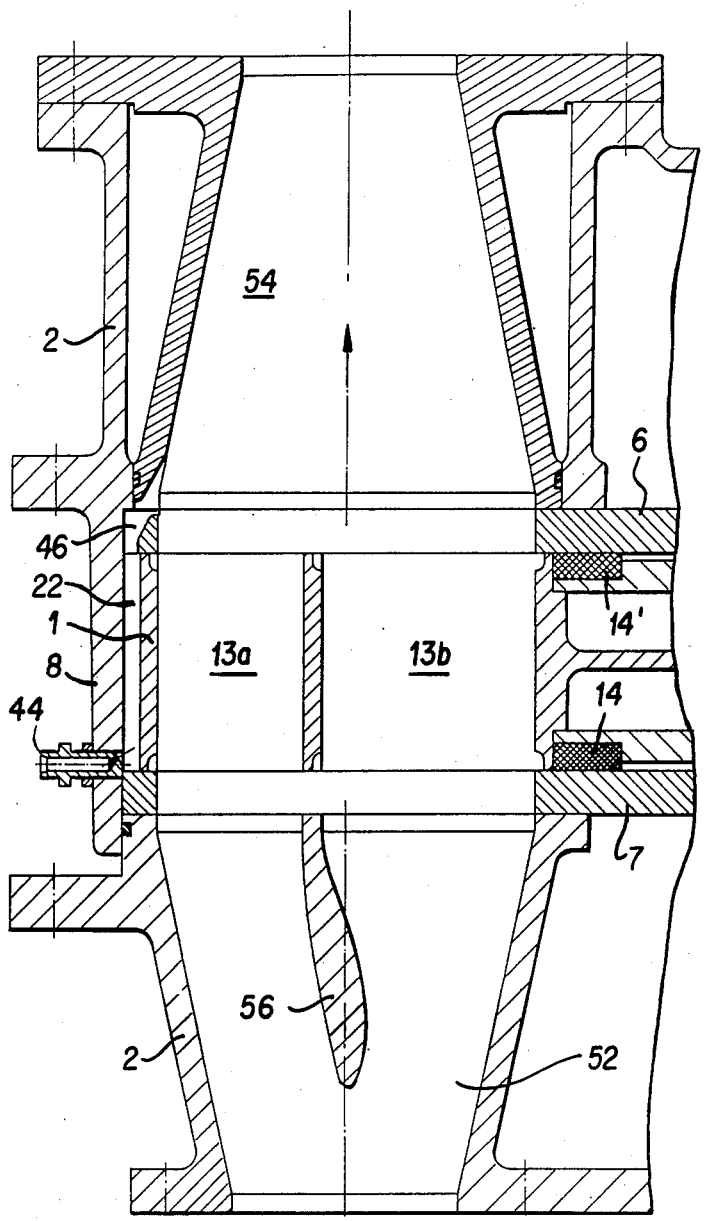
FIG. 4 is a cross-sectional side view through the emptying channel and showing a feeding pocket of the rotor as well as the respective ports of the pneumatic feeding system.
Figure 5:
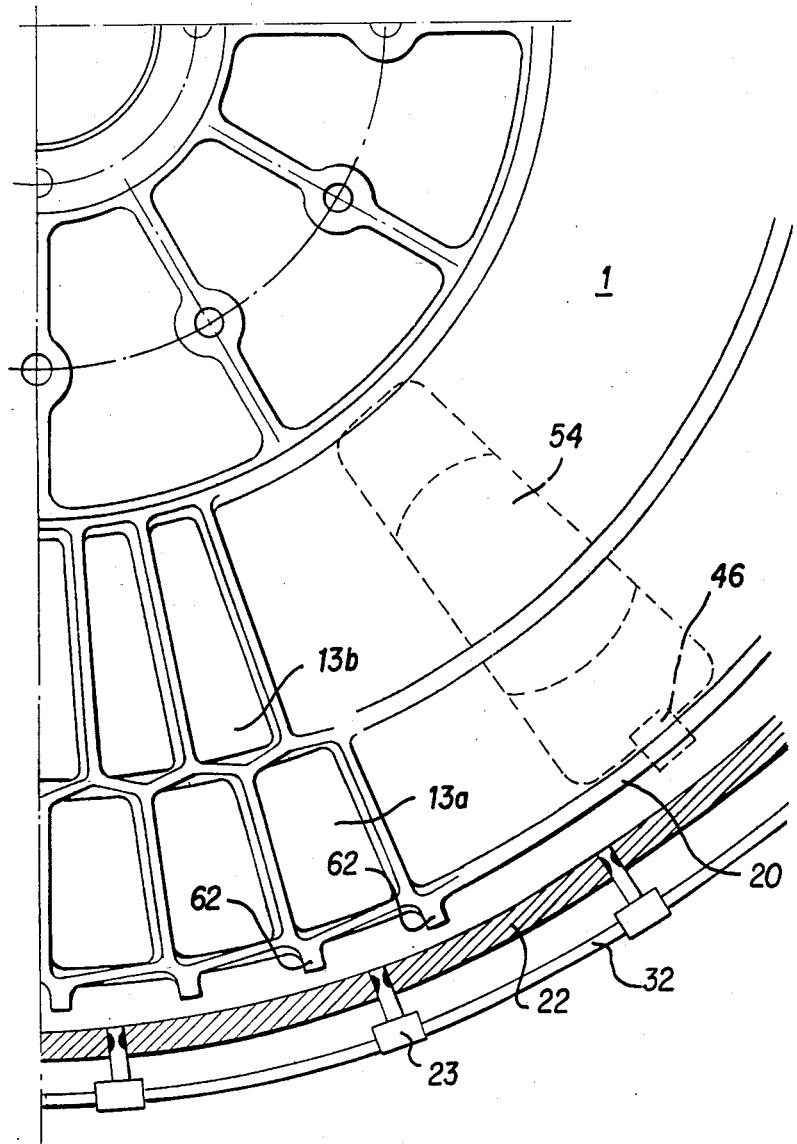
FIG. 5 is a plan view onto a section of the rotor of the apparatus according to the invention.

The Figures show an embodiment of the apparatus 15 according to the invention having a housing 2 enclosing a tightly sealed rotor 1. The rotor 1 is mounted rotatable and drivable by a rotating shaft 3. As a drive a motor/-gearing unit 4 is used which is connected to the housing 2 by torque support members 5. The rotor 1 rotates between two sealing plates 6 and 7 parallel to each other and pressed against the upper and lower faces of rotor 1. The sealing plates 6 and 7 are in engagement with an annular member 8 (FIG. 4). The rotor 1 is provided with a peripheral cylindrical wall 20 (FIG. 5) as well as two groups of feeding pockets 13a, 13b arranged in two concentric rings and offset against each other, as indicated in FIG. 5. Annular seals 14, 14' (FIG. 4) provide a relatively tight sealing of the feeding pockets against the inner part of the rotor 1. The housing 2 is mounted pivotally about an axis II—II at joints 16, 16' of supports 15, 15' and is connected at its left part (FIG. 2) to a force measuring device 17.

The material to be fed through the apparatus and metered therein is stored in a bin 19 arranged above the housing 2 and is fed to the charging port of the rotor 1 directly or via a wheel gate 40 and through the elastic coupling 24.

Figure 1:
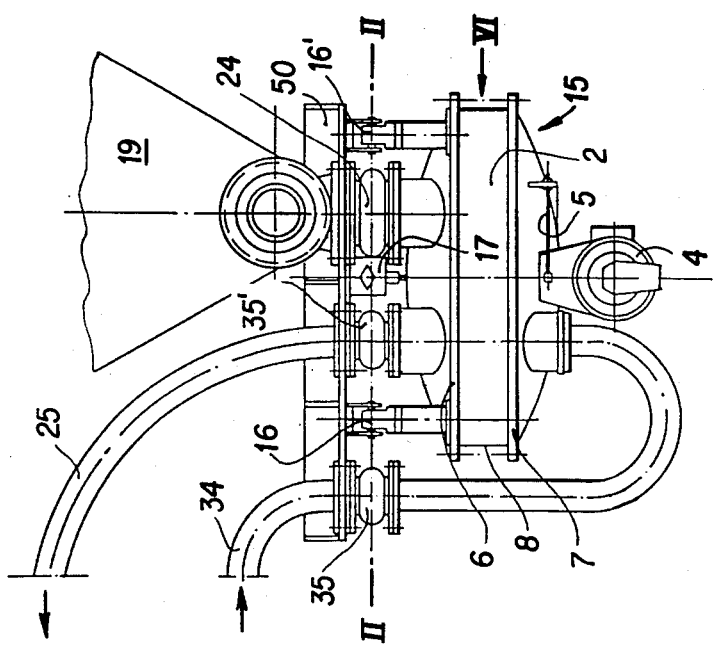
FIG. 1 is a principle side view of one embodiment of the apparatus according to the invention; ;p

The discharging of the feeding pockets filled at the charging port is accomplished at the discharging station shown in FIG. 4 by blowing out the feeding pockets 13a and 13b. For this purpose adjacent to the support 15 a compressed air line 34 is secured by means of an elastic coupling 35 which line is connected to the lower port 52 of the housing 2. The material blown out of the feeding pockets 13a, 13b, is conveyed from an upper port 54 into a pneumatic conveying line 25 (FIG. 1) which is connected to the upper port 54 via an elastic coupling 35'. As may be seen from FIGS. 1 and 2 all the elastic couplings 34, 35, 35' and the joints 16 and 16' are crossed by the pivotal axis II—II.

In operation the housing 2 pivots slightly dependent on the quantity of material to be metered and filled into the feeding pockets 13a, 13b about axis II—II and loads the force measuring device 17 with a corresponding torque.

As explained before, there is an annular interspace 22 between the inner cylindrical surface of the wall of the housing 8 and the peripheral wall 20 of the rotor. Although the upper and lower faces of the wall 20 are pressed against the sealing plates 6 and 7, on the long run some powdered material will penetrate from the feeding pockets 13 into the interspace 22. This may in particular happen upon the generation of a sudden high pressure as caused by an explosion. The material deposited in the interspace 22 causes an increased friction resulting in an increased wear and requiring a higher torque for rotating rotor 1. Furthermore the reproducibility of the metering and the constancy of the zero value of the apparatus may be lost.

According to the present invention a continuous air blocking is provided within the interspace 22. As in particular shown in FIGS. 3 and 5 the cylindrical wall 8 of the housing 2 is provided with at least one nozzle 23 connected to an appropriate source of pressurized air. Though for this purpose a source independent from the metering apparatus may be used, it is preferable to provide a tube 38 within the compressed air line 34 the tube 38 being connected to the nozzle 23 via a line 36 (FIG. 3).

Several nozzles 23 may be provided along the periphery of the cylindrical wall 8 of the housing 2 which may be connected via a common ring line 32 to the line 36 (FIG. 5). An appropriate pressure controlling device may be inserted into line 36. With a first embodiment close to the ports 52 and 54, no nozzles 23 are provided.

Additionally or alternatively at least one nozzle 44 (FIG. 4) may be provided close to the ports 52 and 54 next to the lower sealing plate 7 in the cylindrical wall 8 of the housing 2. The orifice of the nozzle 44 directed into the interspace 22 may be directed upwardly. Essentially above each nozzle 44 a channel 46 is provided between the sealing plate 6 and the cylindrical wall 8 which channel ends into the upper port 54. Such nozzles 44 may be connected to any desired source of compressed air in order to be exerted to a sudden high pressure which forcibly blows out the material from the interspace 22 into the port 54 of the compressed air line 25.

The channel 46 may be designed lockable in order to have the interspace 22 filled with compressed blocking air under normal conditions. Instead of separate nozzles 44 the nozzles 23 could be used for the blowing out, as explained above. The nozzles 44 may be connected to any desired source of pressurized air, preferably via a pressure control device.

In particular FIG. 5 shows an important feature of the inventive design of rotor 1. The outer surface of peripheral wall 20 or rotor 1 is provided with radially extending labyrinth seals formed as flat extensions 62 arranged parallel to the axis of the rotor and sub-dividing the interspace 22 in peripheral direction into radial chambers. This measure prevents the concentric deposition of material in the interspace 22 and enables a concentrated blowing ut of the chambers by means of compressed air supplied via the nozzles 44.

Arranging the feeding pockets 13a and 13b into concentric rings and offsetting them against each other, as mentioned before, enables a more uniform emptying of the feeding pockets at the discharge station, according to FIG. 4. The separating wall 56 divides the compressed air into the feeding pockets 13a on the one hand and the feeding pockets 13b on the other. In FIG. 5 the upper and lower opening of the upper port 54 as well as the blowing out channel 46 are indicated in dashed lines.

Although I have described my invention by reference to particular illustrative embodiments thereof, many changes and modifications of the invention may become apparent to those skilled in the art without departing from the spirit and scope of the invention. All these changes and modifications should be deemed to fall under the scope of the appended claims.

I claim:

1. An apparatus for continuous gravimetric metering and feeding of pourable material comprising:
 - a housing including a side wall having an essentially cylindrical inner surface, and an upper and a lower face wall provided with charging and discharging ports respectively;
 - a rotor mounted in and sealed to said housing for rotation about a vertical axis, said rotor including a plurality of axially extending laterally closed feeding pockets and having a peripheral circular cylindrical surface forming a peripheral annular interspace with said inner cylindrical surface of said side wall of said housing and said upper and lower face walls;
 - means for supplying said interspace with a pressurized gaseous medium;
 - a pneumatic feeding means connected to said discharging port and adapted for emptying feeding pockets passing said discharging port; and
 - a plurality of peripheral vertical flat radial extensions formed on said peripheral cylindrical surface of said rotor extending substantially to said housing side wall and sub-dividing said annular interspace in the peripheral direction, thereby preventing the settling of pourable material in said interspace.

2. The apparatus according to claim 1 wherein said means for supplying said interspace with a pressurized gaseous medium comprises a tube inserted into said pneumatic feeding means and connected via a line with said interspace.

3. The apparatus according to claim 1 wherein said pressurized gaseous medium is continuously supplied to said interspace.

4. The apparatus according to claim 1 wherein at least one nozzle means is provided in said cylindrical wall of said housing for supplying pressurized gaseous medium into the interspace.

5. The apparatus of claim 1 wherein said interspace is provided with at least one exit port.

6. The apparatus of claim 5 wherein said exit port opens into said pneumatic feeding means for discharging the pockets of said rotor.

7. The apparatus of claim 5 wherein the exit port is closeable.

8. The apparatus of claim 1 wherein at least one nozzle means and an exit port for the interspace is provided in said cylindrical side wall, said nozzle means being arranged to supply pressurized gaseous medium to said interspace close to the lower face wall of said housing and said exit port being arranged substantially in vertical relationship to said nozzle means adjacent to the upper face wall of said housing, said pressurized gaseous medium acting to blow out through said exit port any of said pourable material that enters said interspace.

9. The apparatus of claim 1 wherein said feeding pockets are arranged in two concentric rings, the feeding pockets of one ring being offset with respect to the feeding pockets of the other ring.

10. An apparatus for continuous gravimetric metering and feeding of pourable material comprising:
 - a housing including a side wall having an essentially cylindrical inner surface, and an upper and a lower face wall provided with charging and discharging ports, respectively;
 - a rotor mounted in and sealed to said housing for rotation about a vertical axis and having a peripheral cylindrical surface forming an annular interspace with said housing side wall cylindrical inner surface and provided with flat radial extensions sub-dividing said interspace in the peripheral direction, said rotor including a plurality of laterally closed axially extending feeding pockets arranged in a plurality of adjacent concentric rings, said feeding pockets in each of said rings being offset with respect to said feeding pockets of other rings; and said charging and discharging ports radially extending over all of said rings.

11. The apparatus of claim 10 further comprising pneumatic feeding means connected to said discharging port, said pneumatic feeding means being formed with a connection opening that is sub-divided by at least one separating wall, separating said connection opening into a plurality of portions each portion being aligned with a respective one of said rings of said feeding pockets.

12. The apparatus of claim 11, wherein at least one nozzle means and an exit port for said interspace is provided in said side wall, said nozzle means being arranged to supply pressurized gaseous medium to said interspace close to the lower face wall of said housing and said exit port being arranged substantially in vertical relationship to said nozzle means adjacent to the upper face wall of said housing and providing a path for discharge of pourable material that enters said interspace.

13. The apparatus of claim 12, wherein said pressurized gaseous medium is continuously supplied to said interspace.

14. The apparatus of claim 13, wherein said interspace exit port opens into said pneumatic feeding means used for discharging said feeding pockets of said rotor.

15. An apparatus for continuous gravimetric metering and feeding of pourable material comprising:

a housing including a side wall having an essentially cylindrical inner surface, and an upper and lower face wall provided with charging and discharging ports respectively;

a rotor mounted in and sealed to said housing for rotation about a vertical axis, said rotor including a plurality of axially extending laterally closed feeding pockets and having a peripheral cylindrical surface forming an annular interspace with said inner cylindrical surface of said side wall and said upper and lower face walls of said housing, said perpherial cylindrical surface of said rotor being provided with peripheral flat vertical radial extensions sub-dividing said interspace in the peripheral direction;

a pneumatic feeding means connected to said discharging port and adapted for emptying pockets passing said discharging port; and at least one nozzle means and an exit port for said interspace provided in said cylindrical side wall, said nozzle means being arranged to supply pressurized gaseous medium to said interspace close to the lower face wall of said housing and said exit port being arranged substantially in vertical relationship to said nozzle means adjacent to the upper face wall of said housing for discharging pourable material that enters said interspace.

16. The apparatus of claim 15, wherein said feeding pockets are arranged in a plurality of adjacent concentric rings, said feeding pockets of each ring being offset in the peripheral direction with respect to feeding pockets of other rings.

* * * * *